United States Patent [19]

Weigandt et al.

[11] Patent Number: 4,473,590

[45] Date of Patent: Sep. 25, 1984

[54] METHOD FOR OBTAINING PROTEIN-CONTAINING ANIMAL FEED FROM ORGANIC MATTER

[75] Inventors: Friedrich Weigandt, Erkrath-Hochdahl, Fed. Rep. of Germany; Klaus Pöppinghaus, Heidweg 17A, 5100 Aachen, Fed. Rep. of Germany; Hans Einbrodt, Aachen, Fed. Rep. of Germany; Botho Böhnke, Aachen, Fed. Rep. of Germany

[73] Assignee: Klaus Pöppinghaus, Aachen, Fed. Rep. of Germany

[21] Appl. No.: 255,845

[22] Filed: Apr. 20, 1981

[30] Foreign Application Priority Data

Apr. 23, 1980 [DE] Fed. Rep. of Germany ....... 3015515

[51] Int. Cl.³ .............................................. A23K 1/00
[52] U.S. Cl. ........................................ 426/55; 426/56; 426/59; 426/807
[58] Field of Search ..................... 426/55, 56, 2, 59; 71/9, 12, 13, 14

[56] References Cited

U.S. PATENT DOCUMENTS

| 4,018,899 | 4/1977 | Seckler et al. | 426/55 |
| 4,139,640 | 2/1979 | Kipp, Jr. | 426/55 |
| 4,292,328 | 9/1981 | Coulthard et al. | 426/55 X |
| 4,338,337 | 7/1982 | Frankl | 426/55 |

Primary Examiner—Robert A. Yoncoskie
Attorney, Agent, or Firm—Kenyon & Kenyon

[57] ABSTRACT

The invention relates to a method for obtaining protein-containing animal feed from organic substances dissolved and/or suspended in water, where the substances are biologically processed in at least two series-connected stages (I, II) each having an activating tank (5, 7) and a settling tank (6, 8). In the first stage (I) a larger percentage of bacteria than protozoea prevails. The sludge is drained intermittently and alternatingly from the first and second stage (I, II), and conducted to a dehydrating device (9), and a part of the dehydrated sludge is returned to the input (5a, 7a) of that stage from which the sludge was taken. Into at least one of the activating tanks (5, 7), especially into the activating tank (5) of the first stage (I), additives promoting the growth of the micro organisms, especially trace elements and/or minerals, are placed. To the sludge is fed, particularly after the dehydration, a chemical agent that embrittles and/or partially or fully dissolves the cell walls of the micro organisms.

20 Claims, 1 Drawing Figure

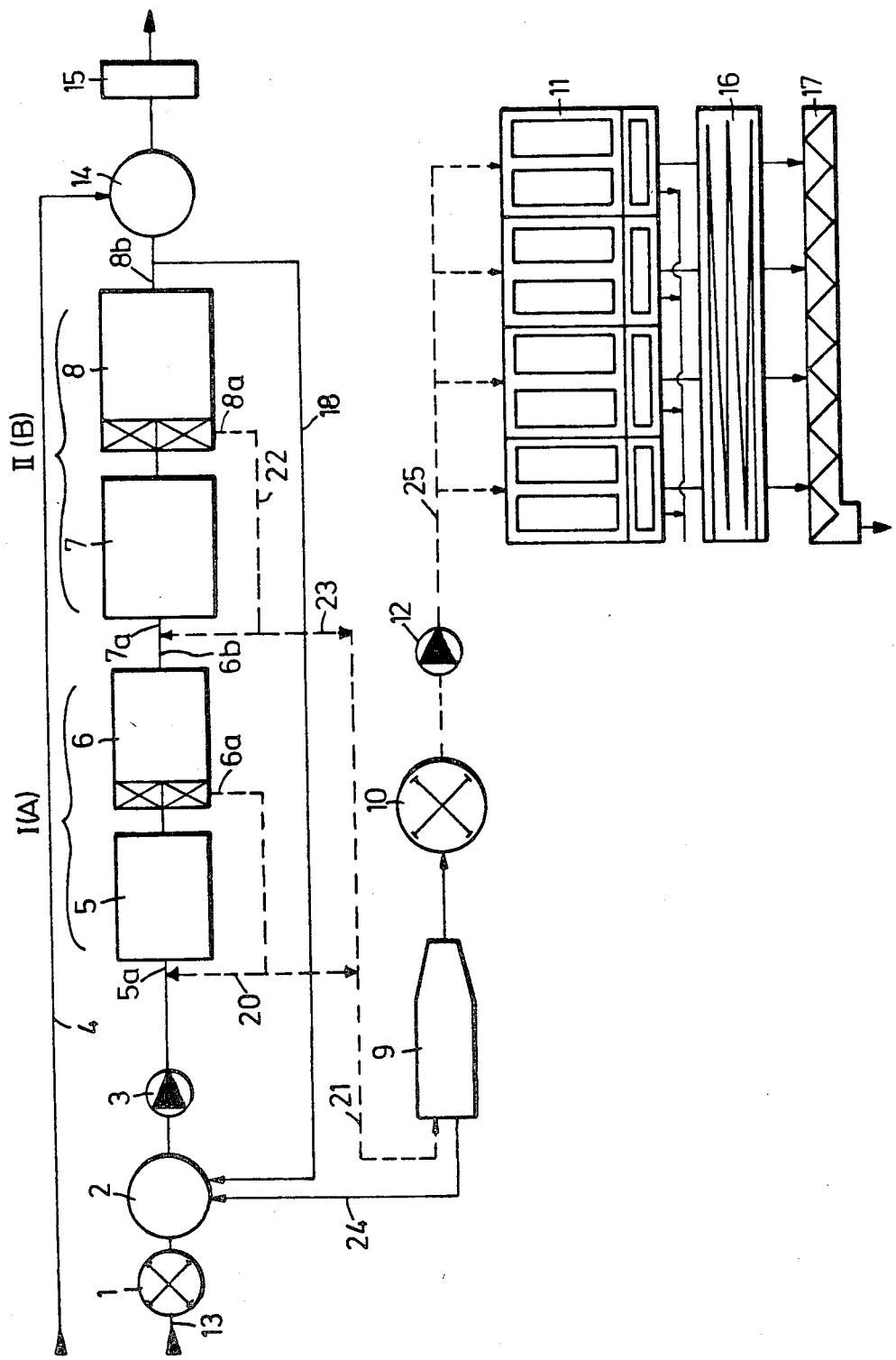

4,473,590

METHOD FOR OBTAINING PROTEIN-CONTAINING ANIMAL FEED FROM ORGANIC MATTER

BACKGROUND OF THE INVENTION

The present invention relates to a method for obtaining protein-containing animal feed from organic substances dissolved and/or suspended in water, where the substances are biologically processed in at least two series-connected steps which have an activating tank and a settling tank.

From DE-OS No. 26 14 875, a two-stage activated-sludge process is known by which waste water is purified. This activated sludge method is not suited for the purification of liquid manure from agriculture operations since liquid manure is loaded with too high a percentage of organic matter. Furthermore, this method has up to now been used only for the purification of waste water.

It is further known from German Pat. No. 22 42 377 to dehydrate excess sludge produced in the biological breaking-down of waste water and to heat it in a thin layer for a short time in order to decompose the bacteria cells.

SUMMARY OF THE INVENTION

It is an object of the present invention to improve upon a method of the kind mentioned at the outset in such a manner that water with a high content of organic substances can be used for obtaining protein-containing animal feed and high yields of easily digestible feed are obtained with a small amount of energy and the greatest possible utilization of the fed-in organic matter.

It is also an object of the invention to make available a method of the type mentioned that requires no external supply of additional water, especially purified water.

According to the present invention, these problems are solved by providing that a larger content of bacteria than protozoae exists in the first stage; that the sludge is intermitently drained alternatingly from the first and the second stage, is fed to a dehydration device and part of the dehydrated sludge is returned to the input of that stage from which the sludge was taken; that in at least one of the activating tanks, especially in the activating tank of the first stage, additives promoting the growth of micro organisms, especially trace elements and/or minerals are placed; and that a chemical agent which embrittles, softens and/or dissolves the cell walls of the micro organisms, is fed to the sludge, especially after dehydration.

The method according to the invention can be used to advantage in the case of waste water highly loaded with organic substances and achieves high yields and a very far-reaching utilization of the fed-in organic matter with a small, simple and inexpensive design of the installation. The highly protein-containing feed is easily digestible and can be fed also in liquid condition. Only a small amount of energy is required and the diluting water need not be supplied from the outside; rather, water produced in the process is utilized. Thus the method operates particularly economically.

Thus, an end product can be obtained from these waste waters which is entirely comparable to the protein obtained from a yeast process. The protein yield is in part even higher.

The use of liquid manure from agriculture operations, especially from pig farms, offers the advantage that the protein obtained from the excess sludge can be admixed back immediately to the feed stock and thus, part of the feed, and particularly the protein-rich valuable part, need not be purchased but is produced at the site itself.

At the same time, the liquid manure problem is solved because the liquid manure is purified in the installation and the content substances form the substrate for the micro organisms.

BRIEF DESCRIPTION OF THE DRAWINGS

The FIGURE represents a schematic illustration of a device for implementing the present invention.

DETAILED DESCRIPTION OF THE INVENTION

Referring to the FIGURE, water highly loaded with liquid or solid organic substances, especially agricultural liquid wastes such as liquid manure from pigs is fed via an inlet 13 to a comminuting device 1 which homogenizes the solid components contained in the water, so that also larger solids can be contained in the water and a settling tank and a rake or screen are unnecessary. The device may contain a pounding mechanism or a shredding pump and improves the processing of the solids by the bacteria since a considerable increase of the surface of the solid components is obtained.

From the comminuting device, the water is conducted to an equalizing tank which equalizes the substance and water quantities produced by the segregation in changing quantities and concentrations, and keeps the settling and suspended components of the liquid manure in suspension by means of a stirrer, and thus prevents settling and precipitation. This equalizing tank has the effect of an intermediate storage device and passes on the water in uniform quantities to a pump 3 which lifts the quantities of liquid manure produced and therefore provides a sufficient hydraulic head for the following treatment stages. At the same time this pump pumps the diluting water quantities which are placed in the equalizing tank via a line 18. Five times as much diluting water is placed in the equalizing tank 2 as the quantity of loaded water fed-in through the inlet 13. In this manner, the optimum loading range for the first activating stage is obtained.

From the pump 3, the loaded water is fed via an inlet to an aerated activating tank 5 in which very many bacteria and few protozoea are contained. The bacteria break down the long-chain, hard-to-decompose molecules so that substantially shorter molecule chains are produced which are easier to decompose and can be absorbed in the second stage by protozoea and bacteria. The first stage is operated as an adsorption stage with very high volume loading of around 10 to 15 kg $BOD_5/m^3/d$ and a dry substance of 1.5 to 2.0 kg $BOD/m^3$.

With the concentration of $BOD_5$, due to the five-fold dilution, of 2,500 mg/l, a 30% elimination rate is obtained. This results in a volume of 650 $m^3$ and a dwelling time of 4.3 hours in the A-stage. The impurities of the liquid manure present are processed in the A-stage into highly protein-containing sludge with a total quantity of about 2,400 kg of dry substance per day.

The amount of oxygen required for the process is made available by large-bubble aeration with a specific power of 31 $W/m^3$. An improvement of the biological bacteria production is obtained by:

(a) Use of micro organisms with a higher digestion intensity, (b) By preferred choice of digestion processes which attack also hard-to-decompose substances and therefore have better digestion of the nutrition offered for the second stage, so that an increased nutrition matter conversion becomes possible in order to obtain increased protein production.

(c) By a preferred choice of micro organisms with greater insensitivity to pH shocks, temperature variations, high temperature and to toxins.

The water treated in the activating tank 5 flows to the settling tank 6 which has a sludge drain. Part of this sludge is returned via a return line 20 to the inlet of the activating tank. The other part of this sludge is taken as excess sludge via a line 21 to a dehydrating device 9. In the intermediate purification carried out in the settling tank 6, the return sludge and the excess sludge as well as the inorganic content of the primary sludge are thereby held back. The substances which are converted into the dissolved form and have been processed for the second stage are conducted via a runoff 6b of the settling tank to the inlet 7a of a second aerated activating tank 7 in which the bacteria and micro organisms present there process this broken-down matter during intensive sludge production.

The remaining $BOD_5$ concentration of roughly 1,600 mg/l is reduced in the process by about 80%. The $BOD_5$ load of 6,416 kg $BOD_5$/day is reduced to about 1,283 kg $BOD_5$/day. In this process a protein-rich bacterial sludge is produced in an amount of 5,132 kg dry substance per day. The volume load is fixed in the interest of a high sludge production to 4 kg $BOD_5/m^3/d$. The activating stage therefore has a total volume of 1,600 $m^3$ and a dwelling time of 10.7 hours.

The oxygen demand required here is ensured by surface aerators, which ensure an output of 56 $W/m^3$.

Overall, an energy requirement of 3,724 kWh/d and a specific energy requirement of 0.49 kWh/kg of protein-containing bacterial sludge produced is required including the other sources of consumption, or 0.7 kWh/kg of feed.

This more intensive production of protein-containing excess sludge is separated in a subsequent post-purification in a second settling tank 8. The sludge deposited there is returned through a return line 22 in part to the inlet 7a of the activating tank 7 and is taken through a branch line 23 to the line 21 which leads to the dehydrating device 9.

The water running out of the settling tank 8 is taken from the runoff 8b to a biological purification plant 14 into which, via a line 4, also domestic waters can be taken, and from the purification system 4 to an UV disinfection device 15, via which the water gets into the receiving ditch. The by far larger part of the water flowing from the settling tank 8 arrives via a return line 18 branching off from the runoff 8b at the equalizing tank 2 as dilution water.

In the line 21 leading to the dehydration device 9, an intermediate storage tank, not shown, can be arranged which equalizes the water-sludge mixture in order to feed uniform quantities to the device 9. The excess sludge from the first and second stages is dehydrated in the dehydration device 9, which may be a centrifuge or a screen press, from 2.5% to aproximately 12% dry substance. The water accumulated in the dehydration device is conducted into the equalizing tank 2 via a line 24. From the dehydration device 9, the thickened sludge is taken via a line 25 to an evaporator 11. In the line 25 there is provided a comminuting device 10, which may be formed by a pounding mechanism or a shredding pump, and homogenizes the sludge so that it can later be spread on in very thin layers in the evaporator 11. A metering pump 12 transports the milled sludge into the evaporator 11 which is preferably a thin-film evaporator. In this evaporator the amounts of sludge are sprayed by rotating surfaces onto inside walls of cylinders, to which they stick, dry and fall off in dry condition. The heating surfaces to which the sludge is applied in thin layers are heated by heating oil or steam to about 120° C. Through contact with these surfaces and due to the small layer thickness, the sludge is heated almost instantly. This thermal shock makes the cell cores explode and causes at the same time the opening up and the killing of the bacteria.

The sludge is taken out by a screw conveyer 17 via a heat exchanger 16. The heat produced in the heat exchanger 16 can be fed to the activating tank 5 and/or 7, in order to accelerate the growth of the micro organisms, especially the bacteria. The growth of the bacteria can also be accelerated by adding trace elements, minerals and certain chemical agents. Through chemical agents, undesirable bacteria, especially bacteria producing toxic substances can also be eliminated.

In the return lines 20 and/or 22, dehydrating devices, especially centrifuges or screen presses may be arranged in order to return thickened sludge to the activating tanks. These dehydrating devices, not shown in the drawing, can also be formed by the dehydrating device 9 by having this dehydrating device operate intermittently and alternatingly, i.e., the sludge in line 20, in line 22 and in line 21 is treated in sequence. With such a mode of operation, the return lines from the settling tank to the activating tanks can be omitted or replaced by lines which run via the dehydrating device 9.

The work of the evaporator 11 can be made easier if fully desalinated water is added to the thickened sludge behind the dehydrating device 9, so that this water is absorbed by the micro organisms. The micro organism thereby becomes fatter so that the micro organisms are broken up and killed during the treatment in the evaporator 11 (thermolysis) with less energy consumption. After the dehydration device 9, a chemical agent can also be added which embrittles the cell walls of the micro organisms.

We claim:

1. A process for obtaining a protein-containing animal feed from organic substances dissolved and/or suspended in water, comprising the steps of:
    (a) obtaining a feed stream comprised of organic substances dissolved and/or suspended in water;
    (b) admitting said feed stream to a first aerated activating tank containing bacteria and protozoea, the content of bacteria being greater than that of protozoea, to effect digestion and decomposition of said organic substances;
    (c) transferring the material processed in said first aerated activating tank to a first settling tank so as to produce separable streams of sludge and dissolved and/or suspended organic materials;
    (d) transferring said stream of dissolved and/or suspended organic material from said first settling tank to a second aerated activating tank containing bacteria so as to further digest and decompose organic materials contained therein;

(e) transferring the material processed in said second aerated activating tank to a second settling tank so as to produce separable streams of sludge and a stream consisting essentially of water and small amounts of dissolved and/or suspended organic materials;

(f) intermittently and alternatingly removing sludge from said first and second settling tanks and returning a portion of said removed sludge to the respective first and second aerated activating tanks;

(g) transferring the remaining portion of said removed sludge to a dehydrator to remove water therefrom;

(h) adding to the dewatered sludge from said dehydrator one or more chemical agents capable of embrittling and/or at least partially dissolving the cell walls of microorganisms contained therein; and (i) thereafter subjecting said dewatered sludge to thermal treatment to kill bacteria and organisms therein.

2. The process according to claim 1 wherein said feed stream of organic substances dissolved and/or suspended in water is obtained from agricultural liquid manure.

3. The process according to claim 1 wherein said feed stream is diluted with water before being admitted to said first aerated activating tank.

4. The process according to claim 3 wherein said dilution water is obtained from the water stream produced in said second settling tank.

5. The process according to claim 1 wherein there is added to at least one of said first and second aerated activating tanks an additive for promoting the growth of microorganisms.

6. The process according to claim 1 wherein said water stream produced in said second settling tank is thereafter transferred to a purification stage.

7. The process according to claim 1 wherein said feed stream is comminuted before being admitted to said first aerated activating stage.

8. The process according to claim 7 wherein said feed stream, after comminution, is diluted with water.

9. The process according to claim 1 wherein said feed stream is first admitted to an equalizing tank for a predetermined period of storage and equilibration before being admitted to said first aerated activating tank.

10. The process according to claim 9 wherein the feed stream in said equalizing tank is diluted with water.

11. The process according to claim 9 wherein the contents of said equalizing tank are stirred or aerated.

12. The process according to claim 1 wherein said dehydrator consists of a centrifuge or a screen press.

13. The process according to claim 1 wherein said thermal treatment consists of subjecting said dewatered sludge to thin-film evaporation.

14. The process according to claim 1 wherein said thermal treatment consists of subjecting said dewatered sludge to a cylinder drier.

15. The process according to claim 1 wherein said thermal treatment consists of spraying said dewatered sludge onto a heated flexible surface from which said sludge, after drying, can be removed by flexing of said surface.

16. The process according to claim 1 wherein dewatered sludge from said dehydrator is comminuted prior to being subjected to said thermal treatment.

17. The process according to claim 16 wherein the sludge resulting from said thermal treatment is cooled in a heat exchanger.

18. The process according to claim 1 wherein there is added to at least one of said first and second aerated activating tanks an agent which kills microorganisms which secrete toxic substances.

19. The process according to claim 17 wherein heat removed from said sludge in said heat exchanger is used to heat at least one of said first or second aerated activating tanks.

20. The process according to claim 1 wherein the dewatered sludge from said dehydrator is thereafter diluted with desalinated water for absorption by the microorganisms therein.

* * * * *